United States Patent [19]
Mooney et al.

[11] Patent Number: 5,951,043
[45] Date of Patent: Sep. 14, 1999

[54] AIR BAG INFLATOR USING LIQUID MONOPROPELLANT AND ADAPTABLE TO PRODUCE OUTPUTS WITH VARIOUS PARAMETERS

[75] Inventors: Thomas Mooney, Palos Verdes; Gaybert B. Little, Redondo Beach, both of Calif.; Guy Little, Mosas Lake, Wash.

[73] Assignee: Hi-Shear Technology Corporation, Torrance, Calif.

[21] Appl. No.: 08/976,790

[22] Filed: Nov. 24, 1997

Related U.S. Application Data

[60] Division of application No. 08/429,739, Apr. 26, 1995, Pat. No. 5,762,369, which is a continuation-in-part of application No. 08/332,415, Oct. 31, 1994, Pat. No. 5,713,595.

[51] Int. Cl.[6] ................................................ B60R 21/26
[52] U.S. Cl. ........................... 280/741; 280/736; 280/742
[58] Field of Search ................................... 280/736, 737, 280/740, 741, 742; 102/272, 530, 531, 202.5, 273

[56] References Cited

U.S. PATENT DOCUMENTS

| | | |
|---|---|---|
| 3,810,655 | 5/1974 | Pracher . |
| 5,060,973 | 10/1991 | Givoanetti . |
| 5,330,730 | 7/1994 | Brede et al. . |
| 5,470,104 | 11/1995 | Smith et al. . |

*Primary Examiner*—Eric Culbreth
*Attorney, Agent, or Firm*—Donald D. Mon

[57] ABSTRACT

A gas generator to provide gases under pressure for an air bag. A combustion chamber and an auxiliary chamber contain a fluid gas-generating charge which is auto-ignitable. The combustion chamber has a burst portion which bursts after ignition, and the generated gases flow from it to the air bag. A conduit interconnects the two chambers. For a low pressure/high temperature regime the conduit acts as a flame suppressor to prevent flame from entering the auxiliary chamber so combustion can occur in the auxiliary chamber. For a high pressure/low temperature regime the conduit is a nozzle which passes the flame. Combustion then occurs in both of the chambers.

3 Claims, 5 Drawing Sheets

5,951,043

AIR BAG INFLATOR USING LIQUID MONOPROPELLANT AND ADAPTABLE TO PRODUCE OUTPUTS WITH VARIOUS PARAMETERS

CROSS-REFERENCE TO OTHER PATENT APPLICATION This is a divisional of applicant's copending U.S. patent application Ser. No. 08/429,739, now U.S. Pat. No. 5,762,369 filed Apr. 26, 1995, which in turn is a continuation-in part of applicants' co-pending U.S. patent application Ser. No. 08/332,415, now U.S. Pat. No. 5,713,595, filed Oct. 31, 1994, both being entitled "Inflator for Vehicular Air Bags".

FIELD OF THE INVENTION

An inflator for vehicle air bags which uses a liquid monopropellant and which can be adapted to produce outputs of gas with various parameters of pressure, temperature, and flow rates.

BACKGROUND OF THE INVENTION

Air bags which inflate upon impact to protect passengers in vehicles have become standard safety items. Their inflators must be inherently stable for long shelf life, and readily and reliably be initiatiable so as to generate and release a substantial volume of gas at a prescribed pressure very quickly, in fact in small fractions of a second.

It is known to store gas for this purpose at a high pressure to release upon impact. The long-term storage of high pressure gas, and the consequences of an unintended breach of its container are distinct drawbacks to such arrangements. Instead the preference is to utilize a chemical charge which, when initiated will release gas in the desired volume and at the requisite pressure. Currently the preference for such a charge is a solid. The known solids generally generate gases and residues which are toxic, or at best are environmentally undesirable.

The disadvantages of both of these charges are well-known. The gas bottle is carried as a potential risk both during the lifetime of the automobile and when the vehicle is scrapped. If the wrecker has not removed the bottle, and inadvertently cuts it, an explosive situation could occur without his foreknowledge. It is both a physical threat of flying objects, and/or a fire threat, because its contents may catch on fire.

The solid charges involve the risks to the wrecker that he may initiate the charge without knowing it, incurring exposure to a toxic substance or of spilling a dangerous substance. The solid products are generally not environmentally suitable, and can readily be ignited.

Further, there are substantial risks inherent in the manufacture of the solid propellent, such as are commonly used for solid gas-generating charges. These charges, often azides, are tabletted in munitions-grade facilities, and have their share of accidents, many of them fatal. The very property that makes these products suitable for air bag inflation—quick reaction to generate high temperatures gases—is also the property which makes them risky to process.

It has only recently become appreciated that a liquid charge can be even more effective for gas generation than a solid charge, and that some of the above risks inherent in the use of a solid charge and compressed gases can be overcome. In fact an inflator according to this invention can eliminate all of them.

However, the earlier efforts to use liquid charges that are known to the inventors herein have required complicated apparatus, and chemical ignition charges that are initiated by still another initiator to set them off. Movable gas control means in them such as pistons are the norm to control the gas-generation reaction and to keep it "burning".

For example, Giovanetti U.S. Pat. No. 5,060,973 utilizes a liquid propellant—a hydroxyl ammonium nitrate-based propellant, which is ignited by a pyrotechnic igniter such as, smokeless powder set off by an electric primer like an exploding bridge wire. In order to ignite the gas-generating charge in the device, the products of combustion of the pyrotechnic igniter must be discharged into it, and in a controlled manner. This requires a movable piston to separate the main charge from the igniter charge, and separate channel means to convey the ignited gases into a reaction chamber while the piston gradually forces the main charge into the reaction chamber.

This is a relatively complicated arrangement, and friction, degradation or destruction of the piston would be expected to lead to an uncertain output. Furthermore, the propellant compound if it leaked (during scrapping of the vehicle, for example) would contaminate the surroundings. In addition, the black powder charge would still be present as a risk to setting off the main charge.

Brede 5,030,730 utilizes a liquified gas—a short chain hydrocarbon such as propane, in combination with nitrous oxide ($N2O$). To ignite this charge, a pyrotechnic igniter is also used to propel a penetrator piston to puncture the container. The piston carries two sets of channels. One is to carry igniter gas into the storage chamber, and the other is to carry them to a chamber from which the hot gases enter the air bag. In some of his embodiments he keeps his components in separate chambers, and the piston has the additional function of enabling the two components to mix. Then the piston is also required to pierce the two chambers.

The hazards that accompany a stored charge of liquefied gas under pressure have been described above, and are found in this construction. Also it requires a movable piston to open the storage chamber or chambers and to regulate and direct the flow of the liquids. Such complications are undesirable in a critical man-safety device.

It is the object of this invention to provide an inflator which requires no moving parts, which even though its charge is under moderate pressure constitutes no storage or scrapping risk, which does not require pyrotechnic means for the charge itself or for its ignition, whose charge composition is environmentally benign, and which can be manufactured, stored and scrapped with no or negligible risk to equipment, facilities, or human life.

The charge of this invention is a liquid monopropellant. As the term "monopropellant" is used herein it means a compound or a mixture of compounds which are stored mixed together, and which, when initiated, involves no addition of other substances to generate the gases.

The use of a liquid monopropellant offers advantages not readily attainable with solid charges and/or hybrid inflators. For example by modifications of the chamber or chambers in which the liquid is stored and combusted (which often is the same chamber), an inflator can be adapted to produce gases at different temperatures, pressures, flow rates, rates of pressure rise, and multiple pulses.

The structures involved are elegantly simple and are highly reliable. It is even possible to adapt such structures to produce sequential pulses of gas triggered by a second impact, or to accommodate such variables as heavier passengers who might require a higher rise rate of gas pressure.

It is another object of this invention to provide such an inflator whose initiator means is unsensitive to stray electrical charges or interference.

It is another object of this invention to provide an inflator with the foregoing advantages among others.

BRIEF DESCRIPTION OF THE INVENTION

An air bag inflator according to this invention utilizes for its source of gas a liquid monopropellant comprising nitrous oxide and a liquid alcohol. The mixture of these chemicals will involve some of the nitrous oxide being dissolved in the alcohol, and some of it being in the gaseous phase. Depending on the temperature and pressure, some of the nitrous oxide may instead or also be in the liquid phase. The mixture when stored will be at an elevated pressure, and at an ambient temperature relative to the location where the inflator is mounted.

According to a preferred embodiment of the invention, the liquid component is a primary or secondary alcohol of a saturated open-chain hydrocarbon (alkane series), with carbon between 1 and 4, preferably ethyl alcohol, and the gaseous component is nitrous oxide (N2O). Ethyl alcohol has the advantage that it is a "green" substance which is biodegradable and can freely be discharged into the environment without risk.

The mixture of liquid and gas components is stored under suitable pressure in a reaction chamber to increase the amount of N2O in the charge.

The reaction chamber is fitted with a passive ignition device which may be an electrical igniter, or less preferably a chemical ignition means set off by an electrical current, or a laser beam. The wall of the reaction chamber includes frangible portions that are opened by pressure generated by generated gases to form discharge ports.

Preferably, but not necessarily, the hot gases flow through an expansion chamber in which any incompleted combustion is completed and the gases are cooled. They then flow into the air bag. Conveniently, baffles may be provided in the expansion chamber to regulate the flow of the gases, and to some extent to control the rate of reaction in the reaction chamber.

The charge is stored in a closed chamber which is constructed to withstand a storage pressure and also the higher pressures which will be generated when the charge is initiated. An initiator is disposed in the combustion chamber.

The combustion chamber wall includes a burst portion which will rupture when a sufficient internal pressure is generated by the charge.

According to one embodiment of the invention, there is no restriction of the flow of generated gases to the burst portion. As will later be shown, this results in a lower pressure, higher temperature gas output. This embodiment is sometimes called a "low pressure-high temperature" device.

According to another embodiment of the invention, a nozzle is placed in the combustion chamber between the burst portion and the major volume of the combustion chamber. As will later be shown, this results in a restricted flow through the nozzle. While the combustion chamber pressure upstream of the nozzle is higher, the output temperature is lower. This embodiment is sometimes called a "high pressure-low temperature" device.

According to a preferred but optional feature of the invention, an auxiliary combustion chamber can be provided which is separately initiated in order to provide for multiple bursts of pressure, thereby providing a different pressure rise rate, or a later burst in response to events subsequent to the first event.

The above and other features of this invention will be fully understood from the following detailed description and the accompanying drawings, in which:

DETAILED DESCRIPTION OF THE INVENTION

An understanding of this invention will be facilitated by an initial consideration of the parameters appropriate to the inflation of an air bag by this inflator. An air bag which is provided to protect passengers in a vehicle upon impact must react very quickly. A person brought to an abrupt stop in a speeding vehicle must be restrained against contact with the vehicle and protected against strong impact with it, and held for the few brief moments in which the violent motions continue. The same considerations are true for side impacts, where a speeding vehicle strikes another broadside, and also for conditions which arise when a vehicle rolls or tumbles. All of these circumstances require an almost immediate inflation of the air bag to a sufficient pressure to hold the person in place, but not so high that the air bag itself would injure the person.

This involves the generation or supply of gas at an initial high pressure outside of the bag in order immediately to provide a sufficient volume of gas, the reduction of this pressure to the desired value for the bag—usually about 45 psia—and reduction of the temperature of the gases to a suitable value which will not harm the material of the bag or injure the person being protected.

Figure 1:
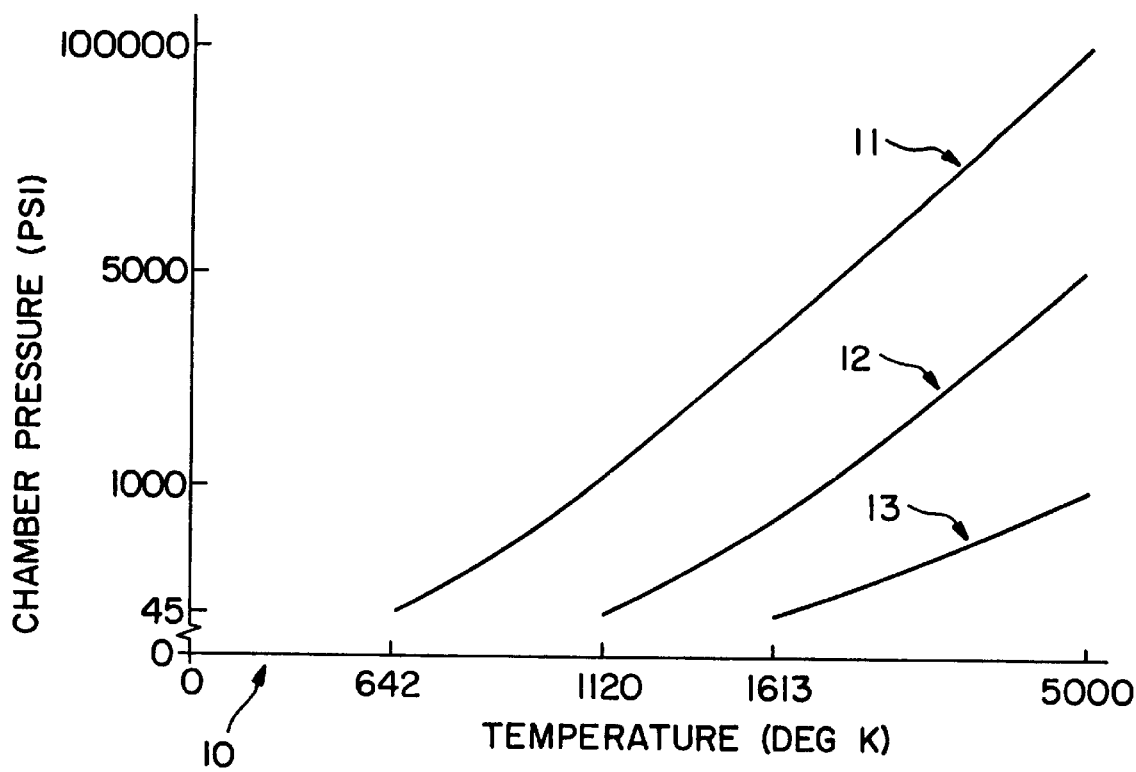
FIG. 1 is a graph showing the performance features of this invention.

FIG. 1 schematically illustrates the interplay of these parameters. In this graph, traces 11, 12 and 13 exemplify several regimes available with this invention. The abscissa is the temperature of the gas, and the ordinate is the pressure of the gas. The traces further represent a time dimension, reading from right to left along the abscissa. The length of the trace is directly proportional to the time involved, trace 11 representing a longer time than either trace 12 or 13, for example.

The right-hand ends of the traces represent the initial high pressure generated in the combustion chamber during combustion. The traces follow from their right hand end to the ultimate air bag pressure at their left-hand end. For every trace, this air bag pressure is 45 psia. It will be observed that the temperature of the gas at the air bag pressure differs remarkably between the traces and the parameters and constructions which they reflect.

It is of interest to observe that this inflator, when adapted to operate on the regime of trace 11 where the initial chamber pressure is much higher reaches the working pressure at an appreciably lower temperature than the regime denoted by traces 12 and 13, where the initial chamber pressures are lower. There are substantial advantages to each of these regimes, and this invention enables the designer to adapt the structure and charge to provide the most advantageous regime for a given installation.

The traces are generalized for convenience in disclosure.

Before discussing the gas-generating charge in detail a further general observation will illustrate the superiority of this liquid charge over a solid charge. In this invention there need be no separate initiator charge, although a chemical squib could be provided if desired. All ignition occurs primarily in the combustion chamber and without necessary participation by any other substance, such as hot gases from an initiator charge (although one can be utilized if desired). After being initiated the reaction of the charge is self-sustaining. Further, because there is a substantial length of charge from the initiator, and the burst port is close to the initiator, the combustion face of the charge will recede from the initiator and from the burst port. The gaseous products will exit through the burst port and no liquid will be expelled to require reaction beyond the burst port. The charge when stored is under pressure, After initiation, the pressure in the chamber (and charge) greatly increases. Therefore no means is needed to expel the liquid charge and the combustion products, because the reaction chamber is closed beyond the burst port and the chamber pressure expels the products of combustion.

Accordingly, in contrast to other known devices that use liquid charges, it is intended that reaction primarily occur in the chamber where the charge is stored. This significantly reduces the bulk and complexity of the device, because it is not necessary to provide a substantial volume in which reaction is to occur downstream from the storage means.

While nitrous oxide is significantly soluble in ethyl alcohol, for example, a greater molar proportion of this gas relative to the alcohol is to be preferred than the proportion of the dissolved gas to the alcohol at standard temperatures and pressures. This can readily be accomplished by increasing the pressure under which the combination of these two components is stored. Of course under pressure there is to be expected some supernatant gas, but much of the nitrous oxide will be dissolved in the alcohol. This is a considerable advantage to this invention, because the reactants will be so fully mixed prior to initiation.

In addition, because the liquid component of the charge will always be in the liquid phase at the temperatures and pressures anticipated to be encountered in storage, and because the critical temperatures and pressures of nitrous oxide are such that at some of the temperatures and pressures to be encountered, nitrous oxide in excess of that which can dissolve may be in the gas phase, it is to be understood that in defining these components, their liquid and gaseous conditions are related to standard temperature and pressure. Although part of the charge will be in the gas phase, and the mixture could more properly be designated as "fluid" instead of liquid, it is primarily a liquid charge and for convenience is discussed as such. By any definition it is not a solid.

The liquid component is selected to be environmentally acceptable, nontoxic to humans, and stable. This component should not include any element or radical which after reaction with nitrous oxide will produce harmful products. A saturated alkane compound which is liquid at standard temperature and pressures is to be preferred. Primary and secondary alkane alcohols with carbon between 1 and 4 are useful, with ethyl alcohol the preferred substance because it is a "green" ( i.e. environmently benign) substance. It is non-toxic (can be denatured), and with nitrous oxide primarily produces carbon dioxide, and nitrogen, and water. Other suitable alcohols are primary methyl-, propyl-, and butyl-alcohols, and isopropyl alcohol.

The gas component is nitrous oxide. It will be recognized that under some circumstances at least some of this component will be liquified, and under all circumstances, some will be dissolved in a liquid. Still this component will be described as a gas.

The molar relationship will be selected with the time to first gas (TTFG), Rise Time and Peak Pressure and effluent gases in mind, as well as the production of fewest other compounds.

While the molar proportions of the liquid component to the gas component can vary from between about 10:90 to about 90:10, and some water can be included, the preferred charge is about 20% liquid component to about 80% nitrous oxide by weight. Water (which is not considered part of the liquid component herein) can be added to vary the proper ignition point, pressure rise time, and volume of gas to be produced, and the ratio of the two reactants can be varied along with it. Water will rarely be added in an amount greater than about 40% of the total charge. Water acts as a burn suppressor and varies the rate of the reaction.

As the mixture becomes richer in the liquid component compared to the gas component, especially beyond about 40% by weight, carbon, methane, hydrogen, carbon monoxide and ammonia begin to appear as pollutants. The preferred ratio is stoichiometric of about 20% by weight of the liquid component to about 80% by weight of the gas component.

A suitable charge by weight is 14.1% ethyl alcohol, 80.9% nitrous oxide, and 5% water. The preferred ratio of alcohol and nitrous oxide is 14.85:85.15 (without water).

About 0.3 grams of charge per liter of inflated bag volume, plus or minus about 15% to adapt for special requirements is suitable. A typical passenger side air bag will require about 30 grams of charge, and the driver side about 15 grams. The amount for side impact bags is highly variable because of varying sizes; and applications. Many will require about 5 to 10 grams.

The initiation of these charges is very rapid—in small fractions of a second. As shown by FIG. 1, the peak pressures in the combustion chamber are very high.

Figure 2:
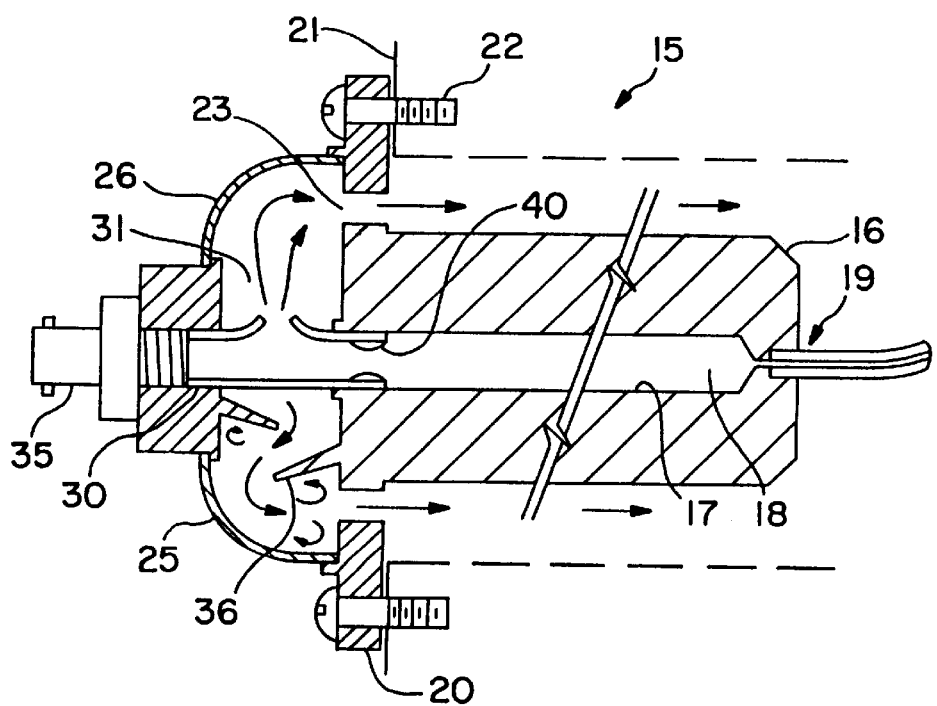
FIG. 2 is a view partly in cutaway cross-section showing a simplified embodiment of the invention.

The inflator 15 shown in FIG. 2 is intended to operate in the regime of trace 11. It includes a body 16 having a heavy wall 17. A combustion chamber 18 is formed by wall 17. A metal fill tube 19 is welded to the body, and when the combustion chamber is filled with the charge, it can be pinched closed and sealed, such as by welding.

Body 16 includes a mounting flange 20 which can be attached to a platform or partition 21 by screws 22. The flange is pierced by a plurality of flow ports 23.

A cap 25 is fixed to the flanges and forms a flow channel 26 leading to ports 23.

A burst tube 30, conveniently made of a material such as copper alloy is welded to the body and forms a continuation of the combustion chamber. A burst portion 31 is formed in the wall of the burst tube, which will burst under sufficient pressure. It is shown burst in the drawing. It is strong enough to resist the storage pressure without bursting. Portion 31 can be formed by thinning the wall of the tube or by notching it, for example.

Initiation means 35 is mounted to the cap and communicates with the burst tube, and thereby with the rest of the combustion chamber. It is possible to utilize a conventional pyrotechnic squib for initiation, but the advantages of a completely green system would be lost. Instead, and preferably, a hot wire or exploding wire will be used. These are well known devices in which the wire is heated or exploded by the passage of a large current such as can be stored in a capacitor. These devices are not subject to the effects of stray currents or electrical interference.

Optional baffles 36 (which would extend around the burst tube) can be provided to give an extended residence time in the inflator before the gases enter the air bag. The further expansion will cool the gases, and the additional time can assure full combustion before the gases enter the air bag.

An air bag mounted to vehicle structure will receive inflator gas from flow ports 23.

Of critical importance in this embodiment is a nozzle 40 located in the combustion chamber on the opposite side of the burst portion from the initiator. It is this nozzle that causes this embodiment to function in the high pressure-low temperature regime of trace 11.

When the charge is initiated, the combustion front will proceed from the initiation means, past the burst portion, and to and through the nozzle. Pressure will quickly burst the burst portion (as shown), and the gases will begin to flow through the open burst portion.

The combustion front passes through the nozzle, and moves through the combustion chamber. Because of the nozzle, the flow from the combustion chamber will be retarded, which results in a very high combustion chamber pressure.

The nozzle is proportioned so as to control the expansion ratio of an adiabatic expansion of the gases to the air bag pressure. In doing so, the temperature of the gases is profoundly reduced. The disadvantage of having to withstand such a large combustion chamber pressure is offset by the fact that it produces a low expanded gas temperature, and there will usually will not require any auxiliary means to cool the gases before they are injected into the air bag.

Figure 3:
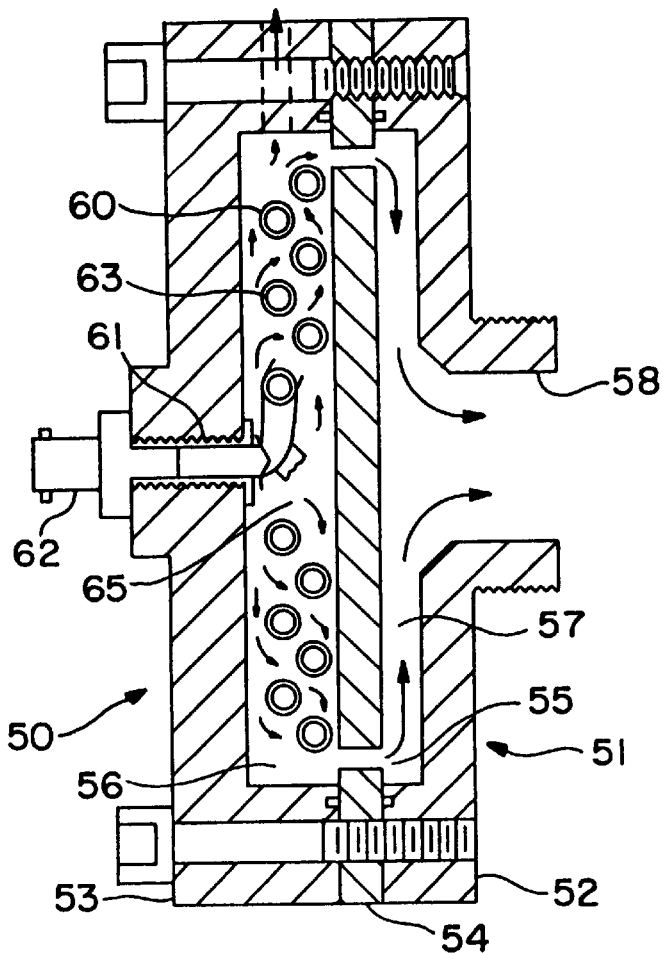
FIG. 3 is a similar view showing another simplified embodiment of the invention.
Figure 4:
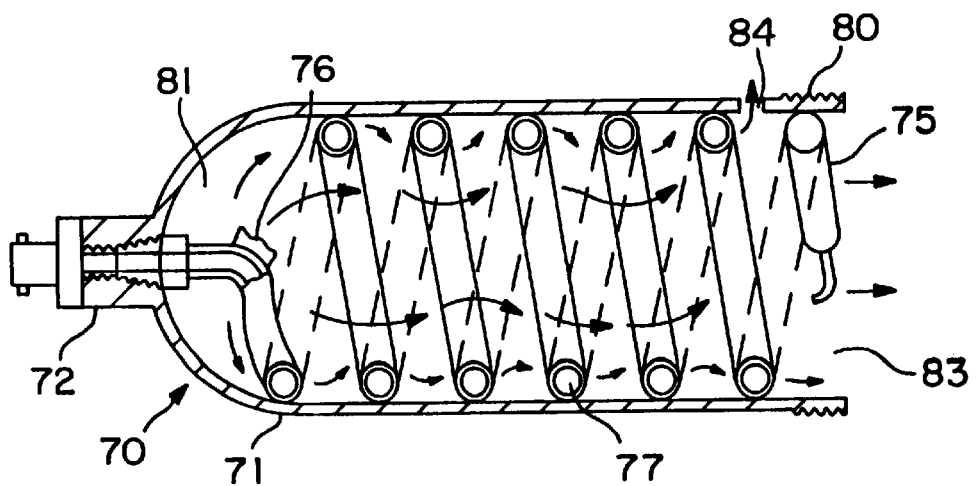
FIG. 4 is a similar view showing yet another simplified embodiment of the invention.

The embodiments of FIGS. 3 and 4 function in a different mode, which is exemplified by trace 13. These are examples of the low pressure-high temperature regime.

FIG. 3 and 4 are identical in concept, but are configured for different types of installations. The inflator of FIG. 3 is round and flat so as to fit in a compact region such as a steering wheel, or in a side panel where there is little depth to receive it.

The embodiment of FIG. 4 is elongated, and can be used where there is ample room for it. Passenger side installations are an example for the use of the device of FIG. 4.

Inflator 50 (FIG. 3) includes a housing 51 comprising a base 52 and a cover 53. A plate 54 is held between the base and the cover. It has a plurality of flow ports 55 which interconnect a first plenum 56 to a second plenum 57. A flow port 58 in the base provides for exit of gases to an air bag (not shown).

A spirally-wound tube 60 is placed in the first plenum. A first end 61 of the tube is fixed to the cover in communication with an initiator 62 that is also fixed to the cover. The tube has a central passage which forms a propellant tank 63. The second end of the tube is closed, so the propellant tank can store the charge at an elevated pressure.

The wall of the tube includes a burst portion 65. As in the embodiment of FIG. 2, this is a weakened or reduced portion which will burst as the consequence of the elevated pressure generated by initiation of the charge. The burst portion is disposed in the first plenum close to, but spaced from, the initiator. The major portion of the combustion chamber is on the opposite side of the burst portion from the initiators.

The construction of FIG. 4 is generally similar. This inflator 70 has a tubular housing 71 with an initiator 72 at a narrowed end.

An elongated tube 75 with a dimension of length and diameter, and also a wall thick enough to resist the intended pressures is connected to the housing. Conveniently it may be made of a copper alloy. A burst portion 76 is provided near the initiator.

The combustion chamber 77 is the lumen of the tube. The free end of the tube is pinched shut and may be welded or otherwise permanently closed.

As in the embodiments of FIGS. 2 and 3, the ratio of length to diameter of the combustion chamber should be greater than one.

The tube may be helically wound to fit in the housing. The housing can be provided with mounting means such as an external thread 80 for mounting to structure of the vehicle.

The housing forms a plenum 81 into which the gases expand and from which they flow to an air bag (not shown). This plenum provides for further cooling of the gases. While combustion is expected to be completed in the combustion chamber, the plenum provides a region in which complete combustion can be assured.

The housing has an open end 83 for the gas outlet. This does permit an axial thrust to be exerted by the housing. Should this be undesirable for the existing gases, side ports 84 may be provided with end 83 closed, so there will be no net thrust.

There are circumstances in which multiple bursts of gas into a single air bag are desirable, or at least their availability. One example is after the air bag is initially inflated at the moment of first impact. This inflation is generally quickly followed by deflation. However, if the vehicle rolls or is somehow struck a second time, additional air bag protection may be needed. Another example is the desirability to exert a different rise rate of pressure, and even of ultimate maximum pressure on the passenger depending on his weight. Greater protection is needed for a three hundred pound man than a sixty pound youth, and the standard inflation may not be suitable (and is not optimum) for both.

A simple solution would be to provide two inflators, separate from each other, to be triggered by different events or circumstances. A problem here is that after impact, one of the inflators may not have been initiated, and will remain in place as a possible risk for repairmen or dismantlers. While the compounds used in this invention are harmless, and if a hot wire initiator is used, it is invulnerable to heat, it is better practice to have the entire installation disabled, rather than only partially. This invention enables sequential bursts from a single inflator source, which when initiated can provide only a single burst or a plurality of bursts, depending on the event, but after a first initiation has occurred, and all events have subsided, there remains no uncombusted material.

Figure 5:
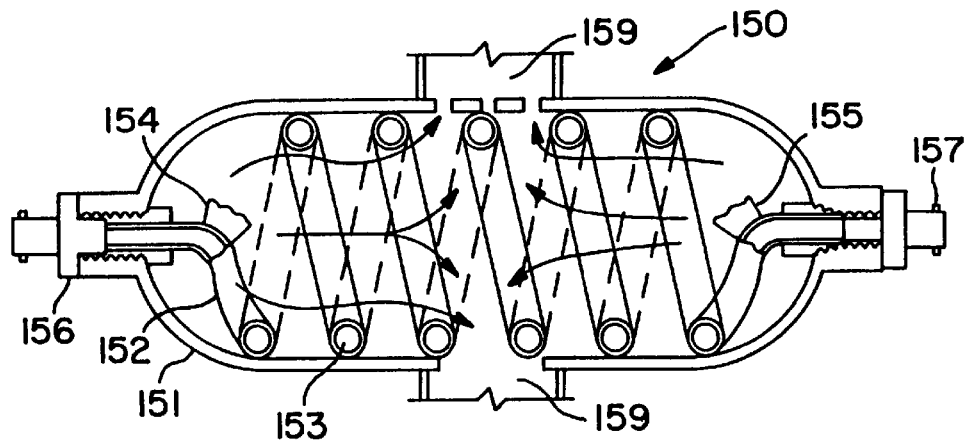
FIG. 5 is a semi-schematic showing of another simplified embodiment incorporating a plurality of combustion chambers.

An inflator 150 for this purpose is shown in FIG. 5. In this device, a housing 151 contains a combustion chamber 152 in the form of an elongated tube whose wall 153 includes a first burst portion 154. This burst portion fractures when a suitable pressure is exerted in the combustion chamber. This embodiment is interesting because its combustion chamber is provided with a second burst portion 155 near the other end of the chamber. A first initiator 156 is disposed at one end of the combustion chamber, and a second initiator 157 near the other end. The burst portions are relatively close to their respective initiators.

The combustion chamber is also the storage chamber for the charge, and both burst portions discharge into the housing. A nozzle may be inserted into the combustion chamber on the opposite side of either or both of the burst portions from the respective initiator, if desired.

When initiator 156 is fired, the charge will generate a pressure which will fracture burst portion 154 and discharge gas into the housing.

Figure 6:
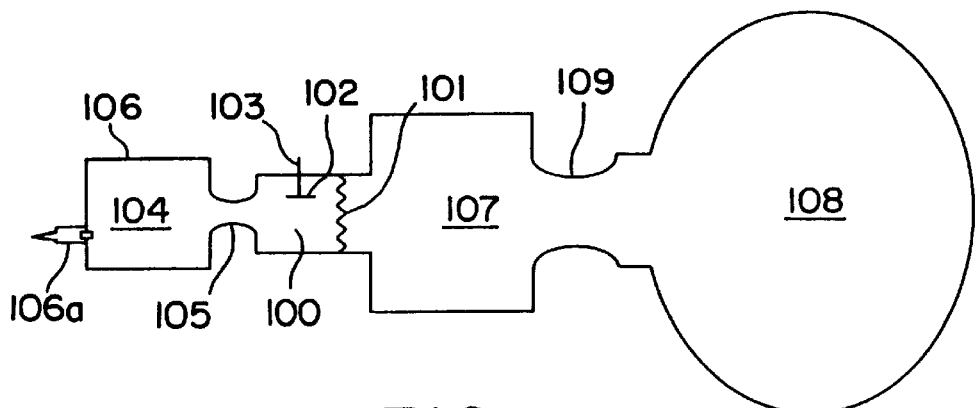
FIG. 6 is a schematic showing of the presently-preferred system adaptable to either of the regimes.

From the housing it flows through ports 159 to the air bag (not shown). If the second initiator is fired before the reaction is completed, a second burst of pressure will be generated which will fracture the second burst portion. The result is a second burst of gas under pressure. FIG. 6 is a somewhat more schematic presentation of this invention receives only a difference in a single conduit, the device can be utilized for either the low pressure/high temperature regime, or for the high pressure/low temperature regime.

A combustion chamber 100 is bounded in part by a frangible burst portion 101. It encloses an initiator 102 with appropriate leads 103. A propellant reservoir chamber 104 (sometimes called an "auxiliary chamber") is connected to combustion chamber 100 through a conduit 105 whose properties are critical to the selection of regime. A fill tube schematically shown at 106 is provided in order to fill chambers 100 and 104 with the monopropellant charge.

An optional expansion chamber 107 receives gases from combustion chamber 100, which in turn flow to gas bag 108.

A nozzle 109 for metering or cooling can be provided between chamber 107 and the gas bag, if desired.

As to conduit 105, its dimensions will determine which of the regimes will ensue after initiation. In the low pressure/high temperature regime, auxiliary chamber 104 functions as a supply source for combustion that occurs in chamber 100. For this reason, conduit 105 is dimensioned so as to permit ready flow of uncombusted charge into chamber 100 where combustion will occur. Accordingly, conduit 105 is primarily dimensioned as a flame-suppressor, so that no flame front from chamber 100 can enter chamber 104.

Thus, a swift and unrestricted flow of products of combustion flows into the expansion chamber and into the air bag at a relatively high temperature.

For operation in the high pressure/low temperature mode, the system is loaded with propellant the same as before, except that combustion is intended to occur in both of chambers 100 and 104. Accordingly, conduit 105 is formed as a nozzle, and not as a flame suppressor. When combustion is initiated in chamber 100, the resulting flame front is intended to pass through conduit 105, and advance along chamber 104. Because combustion occurs in chamber 104, a high pressure is generated in it. Conduit 105 meters the output pressure, and in so doing, profoundly lowers the pressure and the temperature of the gases. Thus in the high pressure regime, chamber 104 acts as a chamber for combustion, rather than merely for supply.

In all respects other than conduit 105, the embodiments are alike. Of course, when the high pressure regime is intended, the walls of chamber 104 must be stronger than when the low pressure regime is intended.

The versatility of this invention provides for sequential bursts in response to multiple events. This arrangement can not only provide a plurality of bursts, but assures that no uncombusted material will remain, even if only a single actuation is required.

Figure 7:
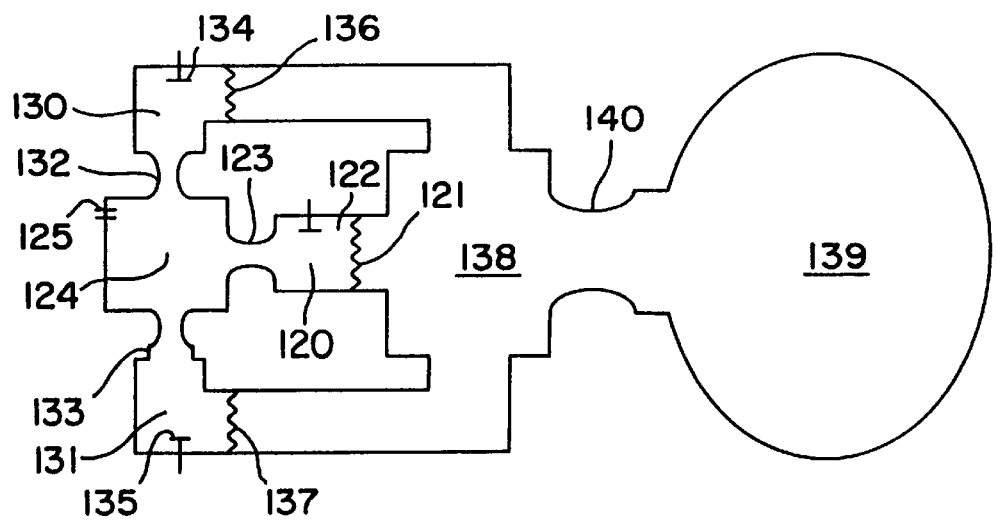
FIG. 7 is a schematic showing an embodiment of a multi-burst device.

For this purpose, as shown in FIG. 7, there is provided a primary combustion chamber 120. It is bounded in part by a burst portion 121. An initiator 122 is mounted in chamber 120. A conduit 123 connects chamber 120 to an auxiliary chamber 124. Chamber 124 is provided with a fill tube 125 through which the entire inflator is charged with propellant.

Secondary combustion chambers 130, 131 are connected to auxiliary chamber 124 through respective conduits 132, 133. Chambers 130, 131 respectively include initiators 134, 135 and burst portions 136, 137.

All three burst portions 121, 136 and 137 form a barrier between their respective combustion chambers and an optional expansion chamber 138. As illustrated, chamber 138 communicates with air bag 139 through an optional nozzle 140, which can provide for metering or cooling of the gases before they enter the air bag. If preferred, the combustion chambers may exhaust directly to the air bag, without combining their effluent gases in a common expansion chamber.

In operation, the first burst will always be from primary combustion chamber 120. Conduit 123 may be dimensioned for either regime. If intended for the high temperature/low pressure regime, conduit 123 will be proportioned to be a flame suppressor. Then auxiliary chamber 124 will act as supply means for the primary combustion chamber.

As pressure reduces in the auxiliary chamber, propellant will flow from the secondary combustion chambers, into the auxiliary chamber and thence into the primary combustion chamber. If neither of initiators 134 and 135 is fired, the monopropellant in both of them will be depleted and combusted, and there will be no remaining propellant to constitute a residual risk.

However, if during the very brief period involved, either or both of initiators 134 and 135 is fired, then the charge in that chamber will be initiated and its respective burst portion will be broken. The generated gases will then flow directly to the expansion chamber or air bag, and need not pass through the auxiliary chamber or the primary combustion chamber. In this way, up to three simultaneous or sequential bursts can be provided.

The primary combustion chamber and auxiliary chamber 124 can be used for either regime by appropriately dimensioning conduit 123 as already discussed.

However, it is necessary that flame from the auxiliary chamber does not enter the secondary combustion chambers, because that would destroy their capacity to respond to a subsequent initiation. For this reason, conduits 132 and 133 will be dimensioned as flame suppressors.

The exits from the secondary combustion chamber are significantly less restrictive to flow of gases than conduits 132 and 133. It is undesirable to require that gases from the secondary combustion chambers pass through the primary combustion chamber.

In actual practice, the initiators will be disposed closely to the burst portions, so as to maximize the amount of combustion in the respective combustion chamber.

In practice, while the primary combustion chamber can operate in either regime, the secondary combustion chambers will function in the low pressure/high temperature regime.

Figure 8:
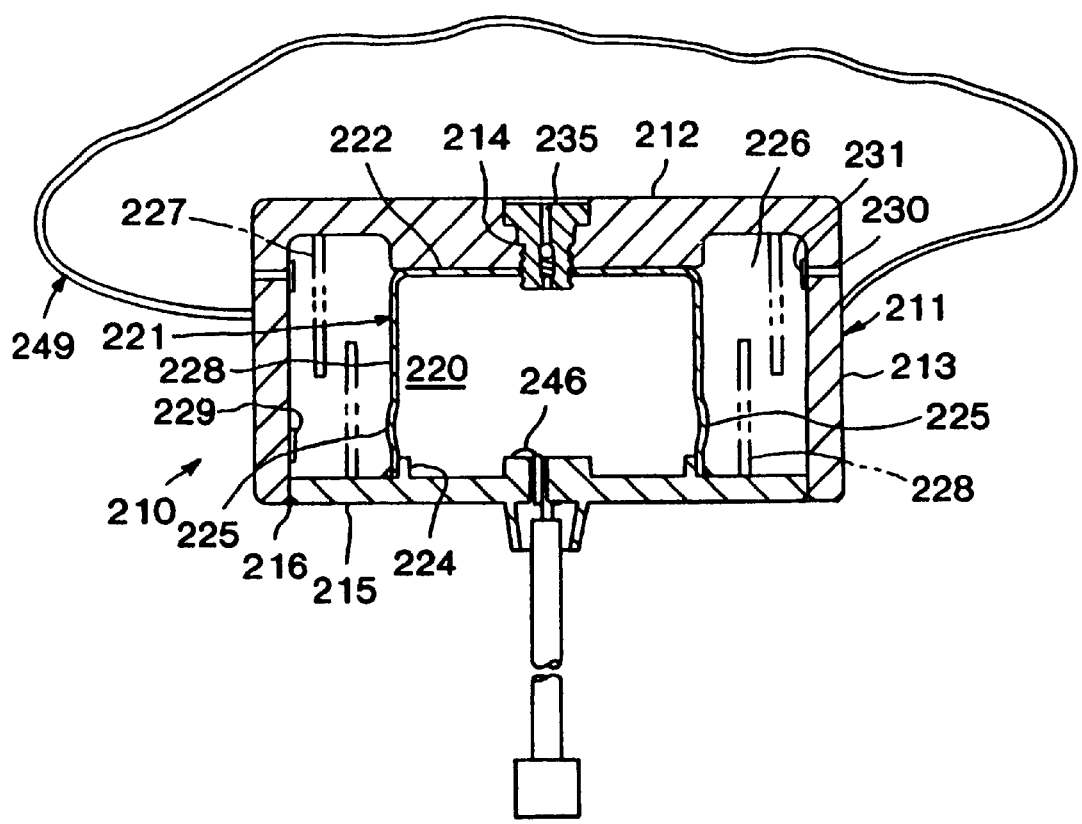
FIG. 8 is an axial cross-section of the presently-preferred embodiment of the invention.

In FIG. 8 an inflator 210 includes a cup-shaped body 211 with a base 212 and an encircling wall 213. A fill port 214 is formed through the base.

An end cap 215 is fitted to the open end of wall 213. A weld 216 structurally joins the body and the end cap, and hermetically seals the interior of the body.

A reaction chamber 220 is formed as a capsular enclosure by a cup-like body 221 having a base 222 which abuts base 212. This base is preferably bonded to it by adhesives or by a weldment (not shown). Body 221 includes a peripheral wall 223 whose open end is welded to the end cap and abuts a circular flange 224 on the end cap. Thus the end cap and the peripheral wall form reaction chamber 220, and make a structural and hermetic seal for it. The fill port extends through base 222 into chamber 220.

Body 221 is made of a suitable metal, with several areas 225 of reduced thickness to provide frangible burst portions that fracture to open when the charge is ignited. Fracture is caused by the pressure of the generated gases. These areas may further be reduced by engraved patterns, which eliminates the incidence of detached metal fragments in the gas stream.

The spacing between walls 213 and 223 forms an expansion chamber 226 in which any incompletely combusted gases may complete their reaction and expand to be cooled as appropriate. Optional annular baffles 227, 228 may extend from the base and the end cap to provide a serpentine path, and to regulate, if necessary, the rate of reaction in the reaction chamber by causing a back pressure in the system.

If desired, patches 229 of a catalytic substance may be applied to the inside of wall 213 to catalyze the reaction of any unreacted components.

Nozzle ports 230 are formed through wall 213 of body 211 they will be closed by a layer of burst foil 231 which will be blown out by the exiting gases.

To fill the reaction chamber with a gas-generating charge, a fill valve 235 is threaded into the fill port. The fill valve is preferably welded to the base to form a permanent and gas tight seal. The fill valve will be of any desired type that enables the reaction chamber to be filled with a liquid charge. After the charging is completed, the fill valve will be permanently closed such as by welding it closed, or by sealing it with an epoxy or metal sealant.

An igniter 240 (FIG. 10) is fitted in an igniter port 241 in the end cap. A connector 242 is provided to connect the igniter with a source of current to initiate the reaction. In the preferred embodiment, a header 243 is fitted and structurally and hermetically fitted to the end cap. It passes leads 244 and 245 to a bridge wire 246, which may merely be a hot wire, or instead may be an exploding bridge wire. Such header and wire constructions are well-known.

Instead of relying on heat or explosiveness of a wire, a thin film may be connected between the leads which carries or consists of a conductive pyrotechnic which will heat and burn to ignite the charge.

Also, instead of leads and an electrical current, a window transparent to laser light may be placed in the header, and a charge through the window. Ignition may either be by direct absorption of the laser light or by laser heating of a pyrotechnic in a film to autoignite the liquid propellant.

It will be observed that the frangible areas in the reaction chamber wall are relatively close to the igniter, for a reason which will later be explained.

A flexible air bag 249 is schematically shown that is connected to the inflator to receive gases from the inflator, thereby to be inflated.

Figure 9:
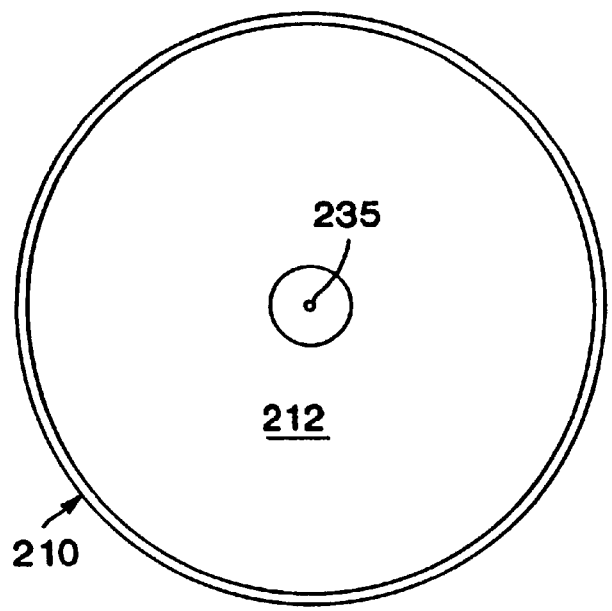
FIG. 9 is a top view taken in FIG. 8.
Figure 10:
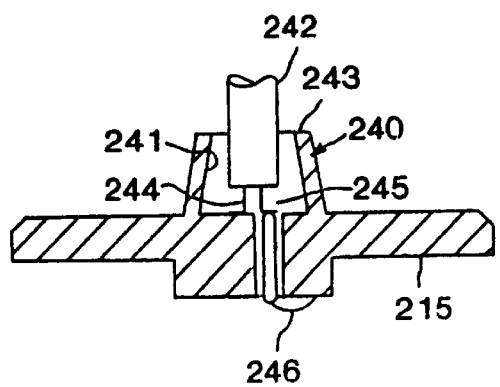
FIG. 10 is an enlarged portion of FIG. 8.
Figure 12:
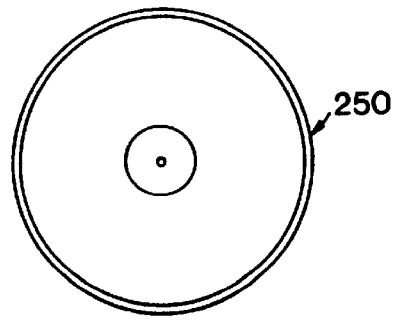
FIG. 12 is a bottom view taken in FIG. 11.

The embodiment of FIGS. 8–10 is most suitable for a driver side inflator, because it is rather squat and can fit into a compartment in the steering wheel. However, for a passenger side installation the height limitation is not as severe and a thinner and longer construction may be made which is more convenient in these locations and which has some advantages of its own. Because most of their parts differ only In relative diversions, the description of the device in FIG. 11 will be brief.

An inflator 250 includes a cup like body 251 and end cap 252 which are joined and respectively include a fill valve 253 and igniter header 254. A tubular body 255 forms a reaction chamber 256 into which both the fill tube and header open.

Nozzle ports 257 are formed through body 251, closed by a burst foil 258. Frangible portions 259 are formed in the wall of body 255. A flexible air bag 259a is shown connected to the inflator.

Figure 11:
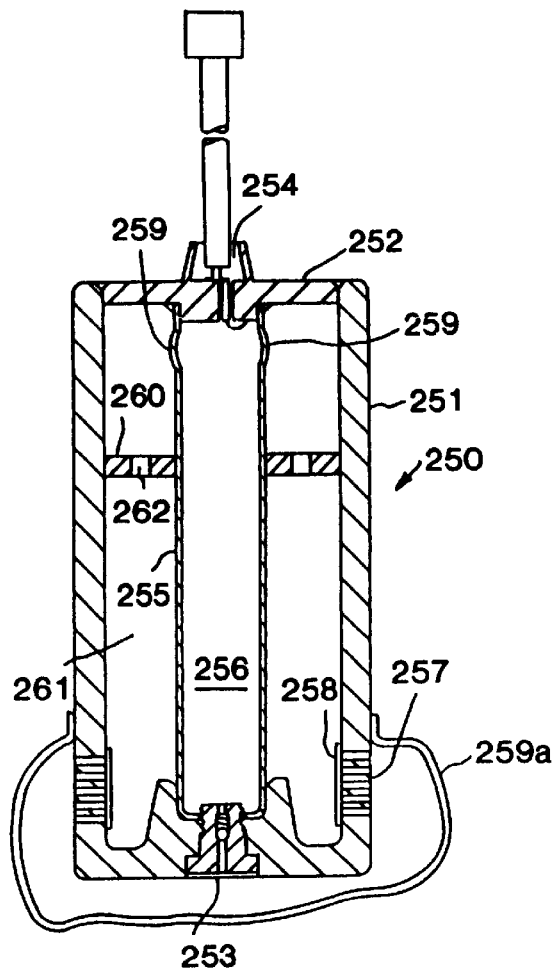
FIG. 11 is an axial cross-section of another embodiment of the invention.

The principal difference between the embodiments of FIGS. 8 and 11 is a ring-shaped baffle plate 260 extending across expansion chamber 261 with baffle ports 262 therethrough. Notice again that the frangible areas are close to the header. The header carries igniter means as already described. Notice that in this invention there is no separate initiator charge. All ignition occurs primarily in the reaction chamber and without participation by any other substance, such as hot gases from an initiator charge. The charge is complete, and when initiated its reaction is self-sustaining. Further, because there is a substantial length of charge from the initiator, and the frangible ports are close to the initiator, the reaction face of the charge will recede from the igniter and from the ports. Its gaseous products will exit through those ports and little or no liquid is exposed to require reaction in the expansion chamber (or in the air bag). No means is needed to expel the liquid charge, because the reaction chamber is closed beyond these ports. Accordingly, in contrast to other known devices that use liquid charges, it is intended that reaction primarily occurs in the chamber where the charge is stored. This significantly reduces the bulk and complexity of the device, because it is not necessary to provide a substantial volume in which reaction occurs, for reaction beyond the storage means (which in this invention also functions as the reaction chamber).

This invention is not to be limited by the embodiment shown in the drawings and described in the description, which are given by way of example and not of limitation, but only in accordance with the scope of the appended claims.

We claim:

1. A gas generator to provide gases under pressure for inflating an air bag, comprising:

a wall forming a combustion chamber, said wall including a burst portion which fractures upon the exertion of a sufficient charge in said combustion chamber;

an initiator inside said combustion chamber for initiating the combustion of a charge contained in said combustion chamber;

an auxiliary chamber;

a conduit connecting said chambers; and a fluid gas-generating charge contained in said chambers, said charge being auto-ignitable by said initiator, and whose reaction is self-sustaining after ignition.

2. A gas generator according to claim 1 in which said conduit is proportioned to function as a flame suppressor, permitting flow of uncombusted charge from the auxiliary chamber into the combustion chamber, while suppressing passage of a flame front from the combustion chamber into the auxiliary chamber whereby substantially all combustion occurs in the combustion chamber.

3. A gas generator according to claim 1 in which said conduit is proportioned to restrict gas flow through it and lower the pressure of existing gases, but to permit flame from the combustion chamber to enter the auxiliary chamber whereby combustion occurs in both chambers, with a restricted flow of combusted gases from the auxiliary chamber into the combustion chamber.

* * * * *